J. A. SCHMITT.
TEAT CUP.
APPLICATION FILED JULY 14, 1919.

1,388,380. Patented Aug. 23, 1921.

Inventor
John A. Schmitt
By H. L. Walker
Attorney

UNITED STATES PATENT OFFICE.

JOHN A. SCHMITT, OF COLUMBUS, OHIO, ASSIGNOR TO THE UNIVERSAL MILKING MACHINE COMPANY, A CORPORATION OF OHIO.

TEAT-CUP.

1,388,380. Specification of Letters Patent. Patented Aug. 23, 1921.

Application filed July 14, 1919. Serial No. 310,727.

*To all whom it may concern:*

Be it known that I, JOHN A. SCHMITT, citizen of the United States, residing at Columbus, in the county of Franklin and State of Ohio, have invented certain new and useful Improvements in Teat-Cups, of which the following is a specification.

This invention relates to improvements in milking apparatus, and more particularly to teat cups therefor of the intermittently inflated or pulsation type.

The object of the invention is to improve the structure as well as the means and mode of operation of such devices, whereby they will not only be cheapened in construction but will be more efficient in use, positive in operation, uniform in action and unlikely to get out of repair.

A further object of the invention is to provide a teat cup which will be universal in its application to teats of varying lengths and diameters whereby the same cups may be used for different cows regardless of the relative size of the teats.

A further object of the invention is to provide a flexible lining or filler for such teat cups in which the tendency to wrinkle transversely will be eliminated and uniform distortion under varying internal and external pressure will be reduced to a minimum.

A further object of the invention, but by no means of less importance, is to provide improved means for connecting the filler or lining with the main housing or cup member and to provide means for taking up slack in the insert or filler and for adjusting the tension thereof and for securing the filler or lining in its adjusted position.

A further object of the invention is to provide an improved form of top or cap for the main housing or cup having therein a cushion or contact ring of rubber or other non-metallic material independent of the filler or lining. This cushion or contact ring carried by the top cap is designed to afford a close contact with the udder, thereby hermetically sealing the interior of the filler or lining without injurious effect or discomfort to the cow.

With the above primary and other incidental objects in view as will more fully appear in the specification, the invention consists of the features of construction, the parts and combinations thereof and the mode of operation or their equivalents as hereinafter described and set forth in the claims.

Figure 2:
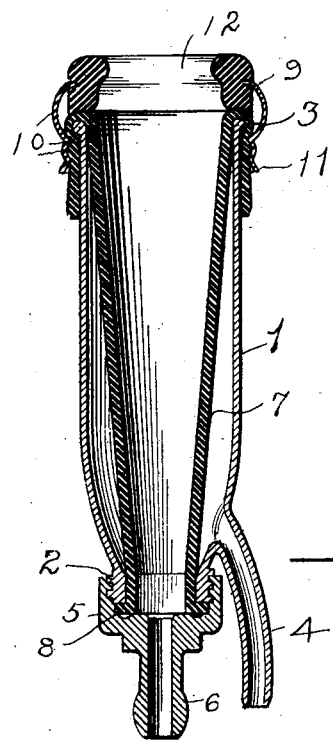
Figure 1:
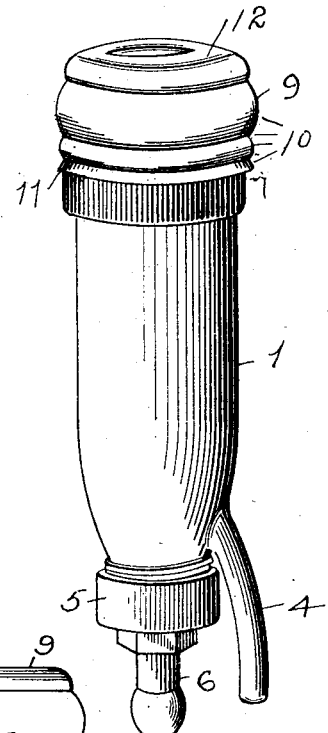
Figure 3:
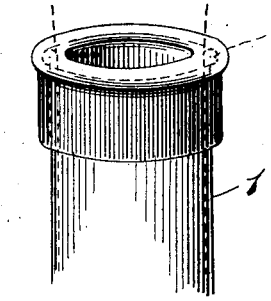
Figures 4, 5:
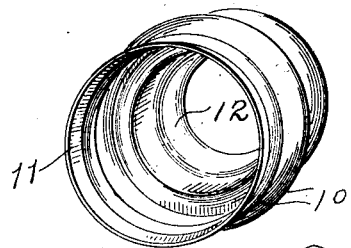

Referring to the drawings, Figure 1 is an external perspective view of the assembled teat cup forming the subject matter hereof. Fig. 2 is a longitudinal sectional view thereof. Fig. 3 is a detail perspective view of the upper portion of the main housing or cup and the filler or lining engaged therewith. Fig. 4 is a detail perspective view of the top cap of the cup showing the locking corrugations and the tension or contact ring. Fig. 5 illustrates a modification embodying a helical or screw threaded engagement of the parts.

Like parts are indicated by similar characters of reference throughout the several views.

The teat cup forming the subject matter hereof is of that type in which a vacuum or suction is constantly maintained upon the interior of the flexible lining comprising the suction chamber and upon the teat contained therein, while air is alternately admitted and exhausted from the housing about the exterior of said flexible lining or filler causing the lining to alternately contract and expand or vibrate. The pulsation or alternation of the lining or filler occurs in rapid succession, usually varying approximately from forty eight to sixty times per minute, and affords a massaging action upon the teat which tends not only to induce and accelerate the flow of milk but also to return upwardly to the udder the blood drawn into the teat by the suction or vacuum action, thereby avoiding congestion.

The teat cup in which the invention has been shown embodied in the drawing comprises a main housing or cup 1 of cylindrical form somewhat contracted or tapered at its lower end where it is provided with a screw threaded neck 2. The upper end of the housing or cup 1 is provided with a peripheral external bead 3, while leading laterally from the housing or cup 1 is a conduit nipple or spud 4 for the connection of the flexible conduit which leads to the suction and pulsation devices. The threaded neck 2 of the cup or housing is engaged by an internally threaded cap 5 which carries an integral nipple or conduit connection 6 for a flexible conduit which leads to the milk pail or receiver.

Inserted within the cup or housing 1 is a lining or filler 7 of tapered or conical form open at its opposite end and having at its lower or smaller end a peripheral collar or flange 8, adapted to be clamped between the interior of the threaded cap 5 and the extremity of the housing or cup 1. In its adjusted position the bore or passage of the nipple 6 communicates with the interior of the lining or filler 7. The lining or filler 7 is of somewhat greater length than that of the cup or housing 1 and in adjusting and engaging the lining or filler with the cup or housing the filler is stretched upward until the walls thereof are given the proper or desired degree of tension whereupon the outer or larger end of the filler or lining is reversed upon itself and turned outwardly and downwardly over the beaded terminal of the cup or housing 1. The reversed end of the lining or filler thus surrounds and incloses the end of the cup or housing.

In order to secure the lining or filler in its adjusted position and to maintain the tension, or to prevent the slippage of the lining or filler and the accumulation of slack, there is provided a top cap 9. This cap comprises an annular band of non-elastic material having therein a series of parallel peripheral corrugations 10. In order to facilitate the adjustment of the retaining cap over the reversed portion of the lining or filler, the lower margin of the cap is somewhat flared outward as at 11. While the peripheral corrugations 10 have been shown as independent parallel configurations, it is obvious that these corrugations may be formed spirally or helically about the cap as at 10ª in Fig. 5, and the terminal bead may be arranged diagonally or helically in relation with the axis as at 3ª in Fig. 5. thus enabling the top cap to be adjusted by a rotary or screw like movement. The relative size of the peripheral bead 3 and the interior of the retaining cap 9 is such that the reversed rubber or elastic lining or filler is compressed as the corrugations of the retaining cap pass over the bead. This tends to stretch the reversed portion of the filler at a point coincident with the bead, and as the concave portion of the corrugation passes beyond the bead the compressed material of the lining or filler expands within such corrugation, while the portion of the filler wall immediately adjacent to the bead is held under compression by a convex or inward projecting portion of the corrugation.

The upper edge of the corrugated band forming the top cap or retaining member is inturned and embedded in an annulus 12 of rubber or other non-metallic material. The construction is such that when the top or retaining cap is fully adjusted upon the reverse extremity of the lining or filler the inner face of the annulus 12 is firmly seated upon the over turned portion of the lining or filler and by the tenacious engagement of the materials tends to hold the lining or filler from relaxing or slipping over the upper edge of the cup or housing. While the annulus 12 is preferably formed of rubber or other yielding material which will afford a cushion like contact with the udder, other non-metallic materials of less elasticity or resiliency may be employed. One of the purposes of this contact ring is to avoid the chill and disagreeable features incident to the use of a metal contact member during cold weather. Moreover the tenacious surface afforded by rubber or like material when brought into contact with the udder of the cow not only does not disturb the animal, as does a cold metal contact, but it also affords a more efficient hermetical seal for the interior or suction chamber of the teat cup. It is to be understood that the form of attachment for the upper end of the insert head lining or filler 7 and the construction of the retaining cap and the use of the contact ring or annulus are in no way dependent upon the particular connection of the lower end of the filler or lining 7, as shown in Fig. 2, but that the clamping of the flange 8 between the cap 5 and the end of the cup or housing is a usual and conventional method of making such connections, and that the features of adjustment and connection of the upper end of the lining or filler may be employed with any other suitable or desired teat cup construction.

It is recognized that the broad idea of reversing the end of the filler or lining over the main cup or housing is not *per se* new in the art, however the improvement herein described and as shown in the drawing, enables the lining or filler to be maintained under tension and resist the slippage thereof or the accumulation of slack while in use, and affords a cushion contact with the udder of the cow which resists the leakage of air at this point of contact, and furthermore this cushion contact ring may be readily and easily renewed independent of the renewal of the lining or filler or vice versa, and the retaining cap is easily engaged and disengaged from the main cup or housing and always engages the lining or filler with uniform pressure, obviating any tendency to cut or tear the rubber lining or filler, as is the case with screw threaded compression caps as heretofore employed.

From the above description it will be apparent that there is thus provided a device of the character described possessing the particular features of advantage before enumerated as desirable, but which obviously is susceptible of modification in its form, proportions, detail construction and arrangement of parts, without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. In a teat cup, a cup, a flexible lining therefor of greater length than the cup, said lining being attached at one end to said cup, the opposite end of the lining being folded outward over and inclosing the opposite end of said cup, and a rigid band inclosing the overturned end of the lining having therein a series of peripheral corrugations.

2. In a teat cup, a cup member, a flexible lining therefor of greater length than the cup member and attached thereto at one end, the opposite end of the lining being folded outward over and inclosing the opposite end of the cup, a cap sleeve inclosing said overturned end of the lining and a contact ring of yielding material engaged with said cap sleeve and bearing upon the overturned edge of the lining.

3. In a teat cup, a cup member, a flexible lining therefor of greater length than the cup member and attached thereto at one end, the opposite end of the lining being folded outward over and inclosing the end of the cup member, and a rigid retaining band having therein a series of peripheral corrugations whereby the overturned portion of the lining is engaged by said band with different pressure at different points thereof.

4. In a teat cup, a cup member, a flexible lining therefor of greater length than the cup member attached thereto at one end and folded outward over and inclosing the opposite end of the cup, and a rigid retaining band encircling the over turned end of the lining having an undulating interior surface.

5. In a teat cup, a cup member of rigid material having a peripheral bead, a flexible lining therefor of greater length than the cup attached thereto at one end, and folded outward over and inclosing the peripheral bead of the cup member at the opposite end, a rigid retaining band inclosing the out turned portion of the lining having an interior groove registering with said bead when in adjusted position, the constricted portion of the band engaging the lining beyond said bead, and a flaring margin on said band, substantially as specified.

6. In a teat cup, a main cup portion and a detachable cap therefor comprising a rigid band and a non-rigid annulus projecting axially beyond said band and adapted to surround and make contact with the teat.

7. In a teat cup, a main cup portion and a detachable cap therefor comprising an annulus of rubber and a rigid band fixedly secured to said annulus and projecting therebeyond detachably connecting the annulus with the cup portion.

8. In a teat cup, a cup member, a flexible lining therefor of greater length than the cup member attached thereto at one end and folded outward over and inclosing the cup member at the opposite end, and a detachable cap therefor comprising a rigid band inclosing the over turned portion of the lining and a non-rigid annulus engaged with said band and resting upon the edge of the overturned fold of said lining.

9. In a teat cup, a main cup member and a detachable cap therefor of rigid material having an inturned annular flange of rubber substantially as specified.

10. In a teat cup, a cup member having an outwardly disposed deflection, a flexible lining therefor of greater length than the cup member attached thereto at one end and folded outward over and inclosing the opposite end of the cup member a retaining band of non-yielding material having an inwardly disposed deflection inclosing the overturned portion, the oppositely disposed deflections of the cup and band being so proportioned as to pass one beyond the other substantially as specified.

11. In a teat cup a cup member, a flexible lining therefor of greater length than the cup member attached thereto at one end and folded outward over and inclosing the opposite end of the cup member, and a non-yielding retaining band slidingly engaging the overturned portion of the lining, the overlapping portions of the cup and band being non-parallel, substantially as and for the purpose specified.

12. In a teat cup, a cup member, a flexible lining therefor of greater length than the cup member attached thereto at one end and folded outward over and inclosing the opposite end of the cup member and a non-yielding retaining band having therein a series of peripheral corrugations slidingly engaging the overturned portion.

13. In a teat cup, a cup member, a flexible lining therefor of greater length than that of the cup member attached thereto at one end and folded outward over and inclosing the opposite end of the cup member, and a non-yielding retaining band having a flaring margin and an interior annular grooved portion separated from the flaring margin by a constricted portion, the latter portion being adapted to engage the overturned lining at a point beneath the terminal margin of the cup member.

14. In a teat cup, a cup member and a detachable cap therefor comprising a rigid retaining band having an inturned marginal edge and an annulus of non-metallic material in which the inturned margin of the band is embedded.

In testimony whereof, I have hereunto set my hand this 30th day of June A. D. 1919.

JOHN A. SCHMITT.

Witnesses:
F. SIEGEL,
JOHN G. G. EKLUNDH.